INVENTORS
FORD A. RICE
ALBERT E. RICE

BY *Isler & Ornstein*

ATTORNEYS

United States Patent Office 3,075,231
Patented Jan. 29, 1963

3,075,231
CASTERS
Albert E. Rice and Ford A. Rice, both of
552 Leader Bldg., Cleveland, Ohio
Filed Dec. 16, 1960, Ser. No. 76,225
1 Claim. (Cl. 16—18)

This invention relates generally to casters, but has reference more particularly to casters of the spherical type.

It has heretofore been proposed, as in Shepherd Patent No. 2,539,108, to provide a caster having a rotary floor engaging roller in the form of a flanged hemispherical section, and a relatively fixed and complementary hollow hemispherical section or body member, the two sections forming in assembly a hollow substantially spherical shell. The flange of the rotary roller, which comprises a spherical segmental section inclined relatively to the vertical axis of the complete sphere, is of enlarged diameter to engage the floor, and the fixed section has formed integrally therein along one end or side a deep tubular recess constituting a bearing in which the vertical swivel axle of the caster is mounted.

The principal objection to such a caster is the fact that there is a joint between the sections so that the sections are likely to pinch the carpet therebetween or pull threads from the carpet. Moreover, when the parts become slightly worn, a space is formed between the sections, through which dust and dirt may enter the caster and cause friction or wear of internal parts.

Another objection to such a caster is that it is made of a number of parts of rather complicated expensive construction, which require considerable care and time in assembling.

The present invention has as its primary object the provision of a caster of the character described, which is of inexpensive construction, consisting of a minimum number of parts which can be quickly and easily assembled.

Another object of the invention is to provide a caster of the character described, in which the rotary floor engaging member is made in the form of a one-piece spherical element, devoid of joints, whereby the likelihood of pinching the carpet or pulling threads from the carpet, as well as the entry of dust or dirt inside the caster, is completely obviated.

Other objects and advantages of our invention will be apparent during the course of the following description.

In the accompanying drawings forming a part of this specification, and in which like numerals are employed to designate like parts throughout the same, FIG. 1 is a front elevational view of one form of caster embodying the invention, with portions thereof broken away to show the construction;

Figure 1:
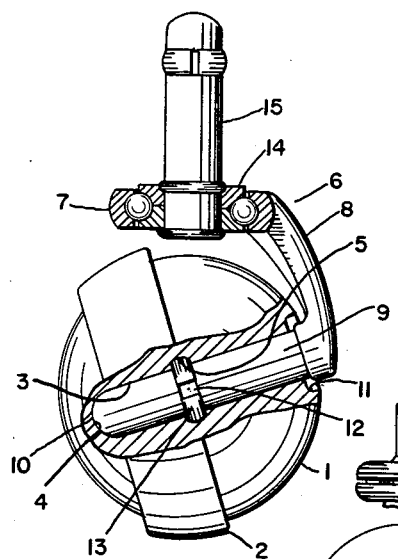
Figure 2:
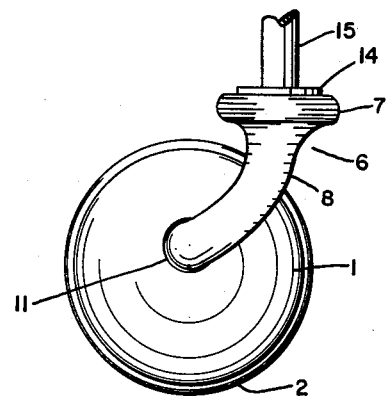
FIG. 2 is a side elevational view of the caster, as viewed from the right side of FIG. 1.
Figure 3:
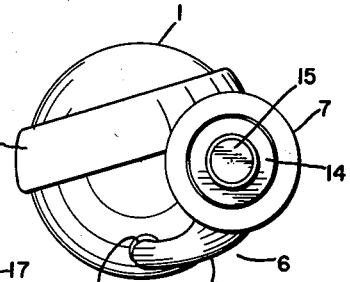
FIG. 3 is a top plan view of the caster of FIGS. 1 and 2.

Referring more particularly to FIGS. 1 to 3 inclusive of the drawings, the caster will be seen to comprise a rotary floor engaging element in the form of a solid sphere 1 having formed integrally therewith a spherical segmental protuberance 2 which is inclined to the vertical axis of the sphere and forms a tread which engages the floor at all times during use of the caster.

The sphere is provided with a recess 3 which extends diametrically into the sphere perpendicularly to the plane of inclination of the protuberance 2, and is provided with a rounded bottom 4. The entrance end of the recess 3, it may be noted, is above the horizontal axis of the sphere 1, and the wall of the recess 3 has an annular groove 5 therein, which serves a purpose to be presently described.

The floor engaging element, which has been described, is supported by a supporting member, generally designated by reference numeral 6, and consisting of an annular portion 7, the axis of which, as indicated in FIG. 2, is spaced forwardly from and is parallel with the vertical axis of the sphere 1, a pendant arm 8 which extends laterally and downwardly from the portion 7 and is curved rearwardly, terminating in a shaft or axle 9, which extends into the recess 3 of the sphere 1, the lower end of the shaft 9 being rounded as at 10 to conform to the rounded bottom 4 of the recess 3, whereby the bottom 4 serves as an end thrust bearing for the shaft 9 and arm 8 is disposed in spaced relation to the countersunk recess 11 of the sphere 1 to avoid friction between the sphere and the arm 8.

The shaft or axle 9 is provided intermediate its ends with an annular recess 12 in which a split ring 13 is disposed. This split ring provides a lock spring, which, when the parts 1 and 9 are assembled, is contracted slightly by the wall of the recess 3, and then expands to enter the groove 5, when the parts are in the relative position shown in FIG. 1, thereby locking the parts 1 and 9 to each other. The split ring 13 fits loosely in the groove 5, so as not to interfere with the free rotation of the sphere 1.

The annular portion 7 of the supporting member 6 provides the outer race of a ball bearing, the inner race 14 of which is fixed to the vertically-extending stem 15 of the caster.

It is thus seen that we have provided a caster of the character described, which is of inexpensive construction, consisting of a minimum number of parts which can be quickly and easily assembled.

Due to the fact that the rotary floor engaging member is made in the form of a one piece spherical element, devoid of joints, the likelihood of pinching the carpet or pulling threads from the carpet is eliminated, and the possibility of dust or dirt entering the caster is avoided, particularly since the point of entry of the shaft or axle 9 into the sphere 1 is above the horizontal axis of the sphere.

Moreover, the curvature and disposition of the arm 8 is such as to enable the overall height of the caster to be reduced to a minimum, and the arrangement of parts is such as to enable the caster to have a quicker and smoother swiveling action than heretofore attainable.

If desired, the axle or shaft 9 may be made as a separate element, which may be riveted or otherwise secured to the arm 8. Moreover, the construction of the ball races may be varied, or other means provided for swivelly connecting the stem 15 to the supporting member 6.

Figure 4:
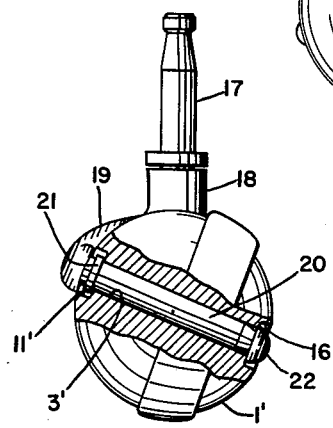
FIG. 4 is a view similar to FIG. 1, but showing a modified form of caster.
Figure 5:
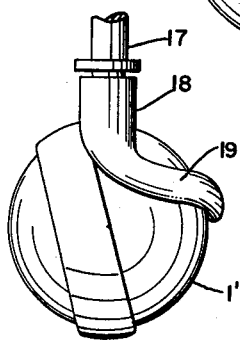
FIG. 5 is a rear elevational view of the caster of FIG. 4.
Figure 6:
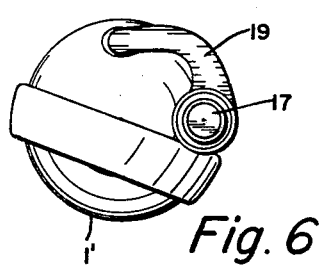
FIG. 6 is a top plan view of the caster of FIGS. 4 and 5.

In the modification of the invention shown in FIGS. 4, 5 and 6, the floor engaging element is of essentially the same shape or form as that in FIGS. 1, 2 and 3, but in this case, the sphere 1' is provided with a bore 3', which extends entirely through the sphere and is provided at its ends with countersunk recesses 11' and 16.

The supporting member, in this case, is pivotally connected to the vertical stem 17 of the caster, and consists of a vertical portion 18 which is spaced forwardly from and is substantially parallel with the vertical axis of the sphere 1' and is partially concealed by the upper portion of the sphere, an arm 19 which extends from the lower end of the portion 18 and is curved laterally and then rearwardly, and terminates in a shaft or axle 20.

The shaft or axle 20 extends through the bore 3' and has an annular flange 21 disposed in the recess 11'. The other end of the shaft 20 is provided with a head 22, which is disposed in the recess 16, so that the flange 21 and head 22 prevent axial displacement of the sphere from the shaft.

Instead of using a head 22 on the shaft 20, the lower end of the shaft may be threaded to receive a nut. Moreover, the shaft may be a separate member which is riveted or otherwise secured to the arm 19.

The caster shown in FIGS. 4, 5 and 6 has all of the advantages of the caster in FIGS. 1, 2 and 3, and can be made at lower cost than the latter, since it does not require the use of the groove in the sphere or a lock spring to secure the sphere to the shaft.

Figure 7:
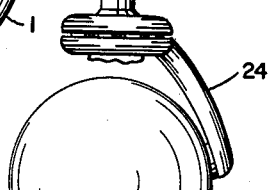
FIG. 7 is a view similar to FIG. 1, but showing another modification of the caster.

In FIG. 7, a further modification of the invention is shown, in which the floor engaging member 23 is a solid sphere, without a raised tread portion, the supporting member 24 is similar to that shown in FIG. 1 and the connection of the member 24 to the sphere 23 is similar to that shown in FIG. 4. This construction is used preferably where it is desired to employ a sphere made of rubber.

It is to be understood that the forms of our invention, herewith shown and described, are to be taken as preferred examples of the same, and that various changes may be made in the shape, size and arrangement of parts thereof, without departing from the spirit of the invention or the scope of the subjoined claim.

Having thus described our invention, we claim:

In a caster of the character described, a solid completely spherical member having a spherical segmental floor-engaging tread portion, which is inclined to the vertical axis of said member, said member having a recess extending diametrically thereinto perpendicularly to the plane of inclination of said tread portion and from a point adjacent the surface of said member, the entrance end of said recess being above the horizontal axis of said member, and a supporting member comprising a horizontal annular portion adapted to provide an outer race for a ball bearing and the axis of which annular portion is spaced directly forwardly from and is parallel with the vertical axis of said first-named member, said supporting member being further provided with a pendent arm formed integrally with said annular portion and extending laterally and downwardly from the outer periphery of said annular portion and being curved rearwardly to conform generally with the curvature of the outer surface of said spherical member, and a shaft formed integrally with said pendent arm and extending from the lower end of said pendent arm and into said recess, the lower end of said shaft resting upon the bottom of said recess, and means for locking said shaft from displacement from said recess.

References Cited in the file of this patent

UNITED STATES PATENTS

| | | |
|---|---|---|
| 627,012 | Raymond | June 13, 1899 |
| 1,458,812 | Fay | June 12, 1923 |
| 2,096,239 | Geyer | Oct. 19, 1937 |
| 2,140,403 | Johnson | Dec. 13, 1938 |
| 2,539,108 | Shepherd | Jan. 23, 1951 |
| 2,847,696 | Kramcsak | Aug. 19, 1958 |

FOREIGN PATENTS

| | | |
|---|---|---|
| 278,881 | Switzerland | Nov. 15, 1951 |